United States Patent
Li et al.

(10) Patent No.: US 10,967,761 B2
(45) Date of Patent: Apr. 6, 2021

(54) POD SEAT WITH ROTATION

(71) Applicant: HONDA MOTOR CO., LTD., Tokyo (JP)

(72) Inventors: Yimeng Li, Tokyo (JP); Ricky Jukuei Hsu, Rancho Palos Verdes, CA (US); Jean-Hugues Tuan Huy Nguyen, Los Angeles, CA (US); Michael McGee, Glendora, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 162 days.

(21) Appl. No.: 16/399,761

(22) Filed: Apr. 30, 2019

(65) Prior Publication Data
US 2020/0346565 A1 Nov. 5, 2020

(51) Int. Cl.
*B60N 2/14* (2006.01)
*B60Q 3/70* (2017.01)
(Continued)

(52) U.S. Cl.
CPC ............. *B60N 2/143* (2013.01); *B60N 2/01* (2013.01); *B60N 2/06* (2013.01); *B60Q 3/70* (2017.02);
(Continued)

(58) Field of Classification Search
CPC . B60N 2/01; B60N 2/305; B60N 2/24; B60N 2/3011; B60N 2/36; B60N 2/06;
(Continued)

(56) References Cited

U.S. PATENT DOCUMENTS

| | | | |
|---|---|---|---|
| 4,341,415 A | * | 7/1982 | Braun ..................... B60N 2/06 296/64 |
| 5,636,884 A | | 6/1997 | Ladetto et al. |

(Continued)

FOREIGN PATENT DOCUMENTS

| | | |
|---|---|---|
| CN | 204309625 U | 5/2015 |
| DE | 102008052480 B4 | 4/2011 |

(Continued)

OTHER PUBLICATIONS

Yanfeng Automotive., Yanfeng Automotive XiM17, 2018, 3 Pages Total, https://www.yfai.com/en/xim17 (as accessed on May 1, 2019).
(Continued)

*Primary Examiner* — D Glenn Dayoan
*Assistant Examiner* — Sunsurraye Westbrook
(74) *Attorney, Agent, or Firm* — Arent Fox LLP

(57) ABSTRACT

Aspects of the present disclosure may include a vehicle having one or more tires, a body, and an occupant compartment including: a rotatable platform, a central pod seat and one or more companion pod seats disposed on the rotatable platform, and one or more rear seats, wherein the rotatable platform is configured to rotate the central pod seat and the one or more companion pod seats toward a front of the vehicle in a first mode and toward a rear of the vehicle in a second mode, and wherein the central pod seat is further configured to translate linearly away from a center of the rotatable platform into a first position and toward the center of the rotatable platform into a second position.

20 Claims, 10 Drawing Sheets

(51) Int. Cl.
  *B60N 2/06* (2006.01)
  *B60N 2/01* (2006.01)
  *B60R 7/04* (2006.01)
  *B60Q 3/78* (2017.01)
  *G05D 1/02* (2020.01)

(52) U.S. Cl.
  CPC ............... *B60Q 3/78* (2017.02); *B60R 7/043* (2013.01); *G05D 1/021* (2013.01)

(58) Field of Classification Search
  CPC ...... B60N 2/062; B60N 2205/35; B60Q 3/44; B60Q 9/00
  USPC .. 296/64, 65.01, 24.34, 65.05, 182.1, 183.1, 296/75, 70, 65.03; 297/216.1, 452.18, 297/188.14, 391, 129, 135, 163, 410
  See application file for complete search history.

(56) References Cited

U.S. PATENT DOCUMENTS

| | | | |
|---|---|---|---|
| 5,879,053 A | | 3/1999 | Lux et al. |
| 6,302,483 B1 * | | 10/2001 | Ricaud ............... B61D 33/0085 297/344.22 |
| 6,912,748 B2 | | 7/2005 | Vansickle |
| 7,347,477 B2 | | 3/2008 | Carty |
| 7,380,859 B2 * | | 6/2008 | Gardiner .................. B60N 2/01 296/64 |
| 8,235,445 B2 | | 8/2012 | Jones et al. |
| 8,944,504 B2 | | 2/2015 | Zimmerman, II |
| 9,016,778 B2 | | 4/2015 | Hellman et al. |
| 9,061,765 B2 | | 6/2015 | Vazquez et al. |
| 9,610,872 B2 | | 4/2017 | Dry et al. |
| 9,725,064 B1 | | 8/2017 | Faruque et al. |
| 9,744,932 B1 | | 8/2017 | Faruque et al. |
| 9,744,933 B1 | | 8/2017 | Rao et al. |
| 9,789,840 B2 | | 10/2017 | Farooq et al. |
| 9,862,290 B2 | | 1/2018 | Yamada |
| 9,902,362 B2 | | 2/2018 | Farooq et al. |
| 9,981,588 B2 | | 5/2018 | Dry et al. |
| 10,486,558 B1 * | | 11/2019 | Baccouche ............ B60N 2/146 |
| 2009/0195037 A1 * | | 8/2009 | Plavetich ............... B60N 2/062 297/257 |
| 2013/0147847 A1 * | | 6/2013 | Koseki ................ B60R 11/0235 345/660 |
| 2014/0021755 A1 | | 1/2014 | Oates et al. |
| 2016/0332539 A1 | | 11/2016 | Rawlinson et al. |
| 2017/0043690 A1 | | 2/2017 | Dry et al. |
| 2017/0210329 A1 | | 7/2017 | Rao et al. |
| 2017/0259772 A1 | | 9/2017 | Farooq et al. |
| 2018/0065585 A1 | | 3/2018 | Jaradi et al. |
| 2018/0105076 A1 | | 4/2018 | Dry |
| 2018/0105080 A1 | | 4/2018 | Dry |
| 2018/0126941 A1 | | 5/2018 | Faruque et al. |

FOREIGN PATENT DOCUMENTS

| | | |
|---|---|---|
| DE | 10355519 B4 | 7/2013 |
| DE | 102015111796 A1 | 2/2016 |
| FR | 2982208 B1 | 12/2013 |
| JP | 5186850 B2 | 4/2013 |
| JP | 5228421 B2 | 7/2013 |

OTHER PUBLICATIONS

Yanfeng Automotive., Yanfeng Automotive XiM18, 2018, 5 Pages Total https://www.yfai.com/en/the-next-living-space, (as accessed on May 1, 2019).

* cited by examiner

POD SEAT WITH ROTATION

TECHNICAL FIELD

The present disclosure generally relates to rotatable seats used in transportation.

BACKGROUND

Conventional vehicles may include many features to improve vehicle performance, fuel economy, and occupants comfort and enjoyment in order to fulfill the needs and/or lifestyles of different occupants. For example, occupants may utilize the traditional vehicles for routine tasks, such as commute to work and running errands, as well as leisure functions such as embarking on short range or long range road trips. To accommodate various functions, versatility in seating arrangement may be desirable.

Conventional passenger vehicles include driver-side and passenger-side front seats normally oriented facing a forward direction of travel. Vehicle seats generally include controls for adjusting the position of the seat. More advanced vehicle seats include power movement, adjustable lumbar support, adjustable side bolsters, seat and back heating, sound systems, and ventilation systems.

Passenger vehicle seating, however, is typically limited to fixed locations for each seat. For example, seats are arranged in forward facing rows. Even special purpose vehicles such as limousines typically have a fixed seating arrangement. In an autonomous vehicle, however, a fixed location for vehicle operator and/or passenger seats may not be necessary.

Therefore, it may be desirable for a vehicle to include seats having non-fixed locations.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

Aspects of the present disclosure may include a rotatable platform, a central pod seat and one or more companion pod seats disposed on the rotatable platform, and one or more rear seats, wherein the rotatable platform is configured to rotate the central pod seat and the one or more companion pod seats toward a front of the vehicle in a first mode and toward a rear of the vehicle in a second mode, and wherein the central pod seat is further configured to translate linearly away from a center of the rotatable platform into a first position and toward the center of the rotatable platform into a second position.

Other aspects of the present disclosure may include an occupant compartment having a rotatable platform, a central pod seat and one or more companion pod seats disposed on the rotatable platform, one or more rear seats, wherein the rotatable platform is configured to rotate the central pod seat and the one or more companion pod seats toward a front of the vehicle in a first mode and toward a rear of the vehicle in a second mode and wherein the central pod seat is further configured to translate linearly away from a center of the rotatable platform into a first position and toward the center of the rotatable platform into a second position.

Some aspects of the present disclosure may include a rotatable platform having a central pod seat and one or more companion pod seats disposed on the rotatable platform, wherein the rotatable platform is configured to rotate the central pod seat and the one or more companion pod seats toward a front of the vehicle in a first mode and toward a rear of the vehicle in a second mode, wherein the central pod seat is further configured to translate linearly away from a center of the rotatable platform into a first position and toward the center of the rotatable platform into a second position.

BRIEF DESCRIPTION OF THE DRAWINGS

The features believed to be characteristic of aspects of the disclosure are set forth in the appended claims. In the description that follows, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advantages thereof, will be best understood by reference to the following detailed description of illustrative aspects of the disclosure when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

A "processor," as used herein, processes signals and performs general computing and arithmetic functions. Signals processed by the processor may include digital signals, data signals, computer instructions, processor instructions, messages, a bit, a bit stream, or other computing that may be received, transmitted and/or detected.

A "bus," as used herein, refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a vehicle bus that interconnects components inside a vehicle using protocols, such as Controller Area network (CAN), Local Interconnect Network (LIN), among others.

A "memory," as used herein may include volatile memory and/or non-volatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and/or direct RAM bus RAM (DRRAM).

An "operable connection," as used herein may include a connection by which entities are "operably connected", is one in which signals, physical communications, and/or logical communications may be sent and/or received. An operable connection may include a physical interface, a data interface and/or an electrical interface.

A "vehicle," as used herein, refers to any moving vehicle that is powered by any form of energy. A vehicle may carry human occupants or cargo. The term "vehicle" includes, but is not limited to: cars, trucks, vans, minivans, SUVs, motorcycles, scooters, ATVs, generators, lawnmowers boats, personal watercraft, and aircraft. In some cases, a motor vehicle includes one or more engines.

Figure 1:
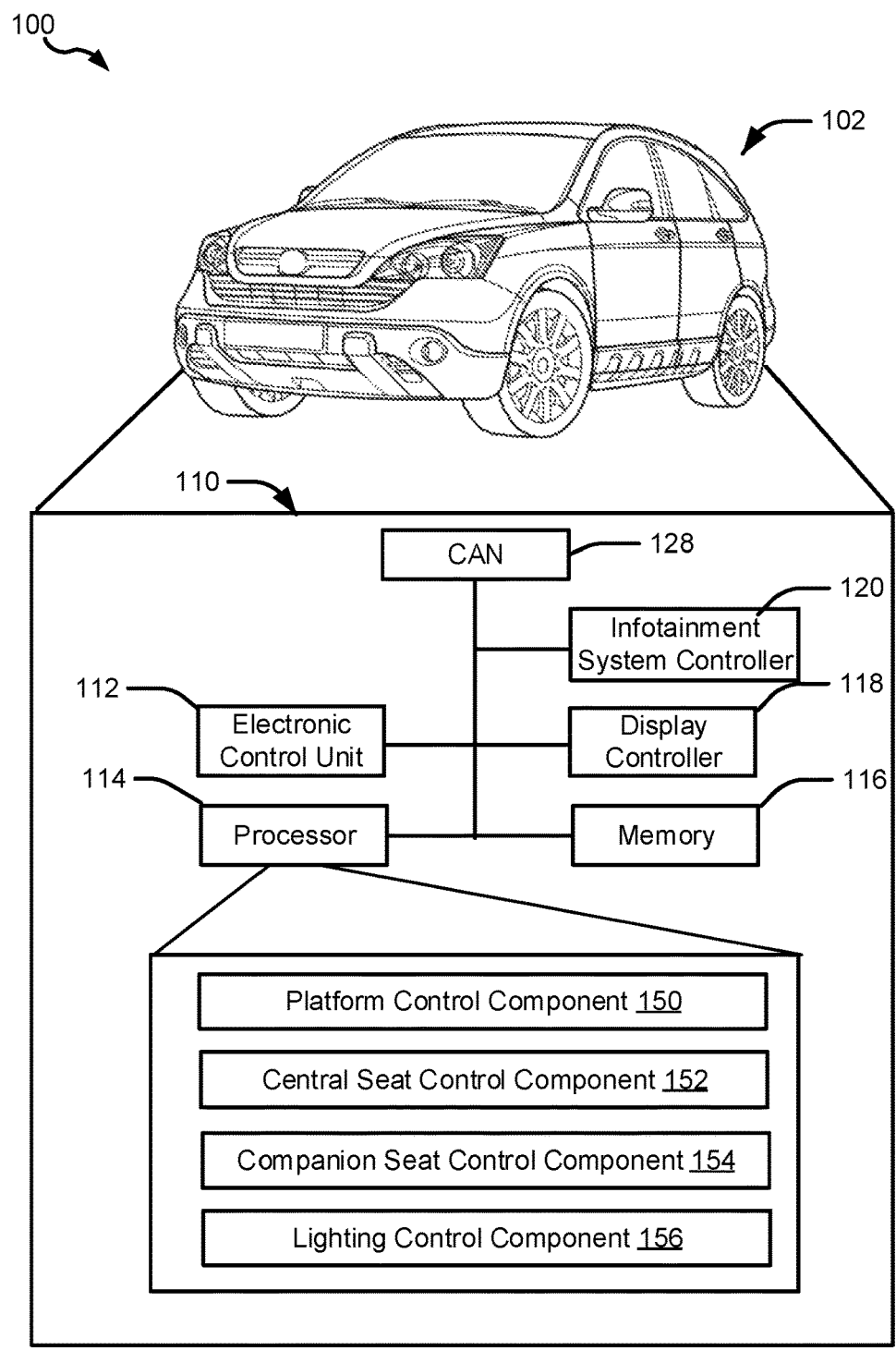
FIG. 1 illustrates a schematic view of an example operating environment of a rotatable platform with pod seats in accordance with aspects of the present disclosure.

Turning to FIG. 1, a schematic view of an example operating environment 100 of a vehicle seating control system 110 and example methods according to an aspect of the disclosure are provided. The vehicle seating control system 110 may reside within a vehicle 102. The components of the vehicle seating control system 110, as well as the components of other systems, hardware architectures, and software architectures discussed herein, may be combined, omitted or organized into various implementations.

The vehicle 102 may be a passenger vehicle, such as a sedan, coupe, sports-utility vehicle, pick-up truck, van, mini-van, bus, etc. The vehicle 102 may be a self-drive vehicle. For example, the vehicle 102 may be a level 3 driving automation vehicle. For a level 3 automation vehicle, the vehicle operator may safely turn his/her attention away from the driving tasks (e.g., conversing with others, texting, eating). The level 3 vehicle may handle situations that require immediate responses, but may solicit vehicle operator feedback in some circumstances. Alternatively, the vehicle 102 may be a level 4 driving automation vehicle. For a level 4 automation vehicle, the control system may be in substantially complete control of the vehicle with minimum vehicle operator input necessary. While the vehicle operator may control the vehicle if desired, the level 4 automation vehicle may safely and autonomously operate. The vehicle 102 may generally include an electronic control unit (ECU) 112 that operably controls a plurality of vehicle systems. The vehicle systems may include, but are not limited to, the vehicle seating control system 110 and a vehicle infotainment systems 120, among others, including vehicle body monitoring systems, vehicle HVAC systems, vehicle audio systems, vehicle video systems, vehicle telephone systems, and the like. The vehicle seating control system 110 may also include a processor 114 and a memory 116 that communicate with the ECU 112, display input 164, and controller area network (CAN) 128.

The ECU 112 may include internal processing memory, an interface circuit, and bus lines for transferring data, sending commands, and communicating with the vehicle systems. The ECU 112 may include an internal processor and memory, not shown. The vehicle 102 may also include a bus for sending data internally among the various components of the vehicle seating control system 110.

The processor 114 may include a platform control component 150, a central seat control component 152, a companion seat control component 154, and a lighting control component 156. The platform control component 150 may be configured to control the rotation of a rotatable platform (described below) in the vehicle 102. The central seat control component 152 may be configured to control the transverse position and/or the rotation of a central pod seat (described below). The companion seat control component 154 may be configured to control the rotation of one or more companion pod seats (described below). The lighting control component 156 may be configured to control the lighting fixtures on the platform. In certain examples, the platform control component 150, the central seat control component 152, the companion seat control component 154, and/or the lighting control component 156 may be implemented as hardware in the processor 114, as software stored in the memory 116, or a combination of hardware and software.

Figure 2:
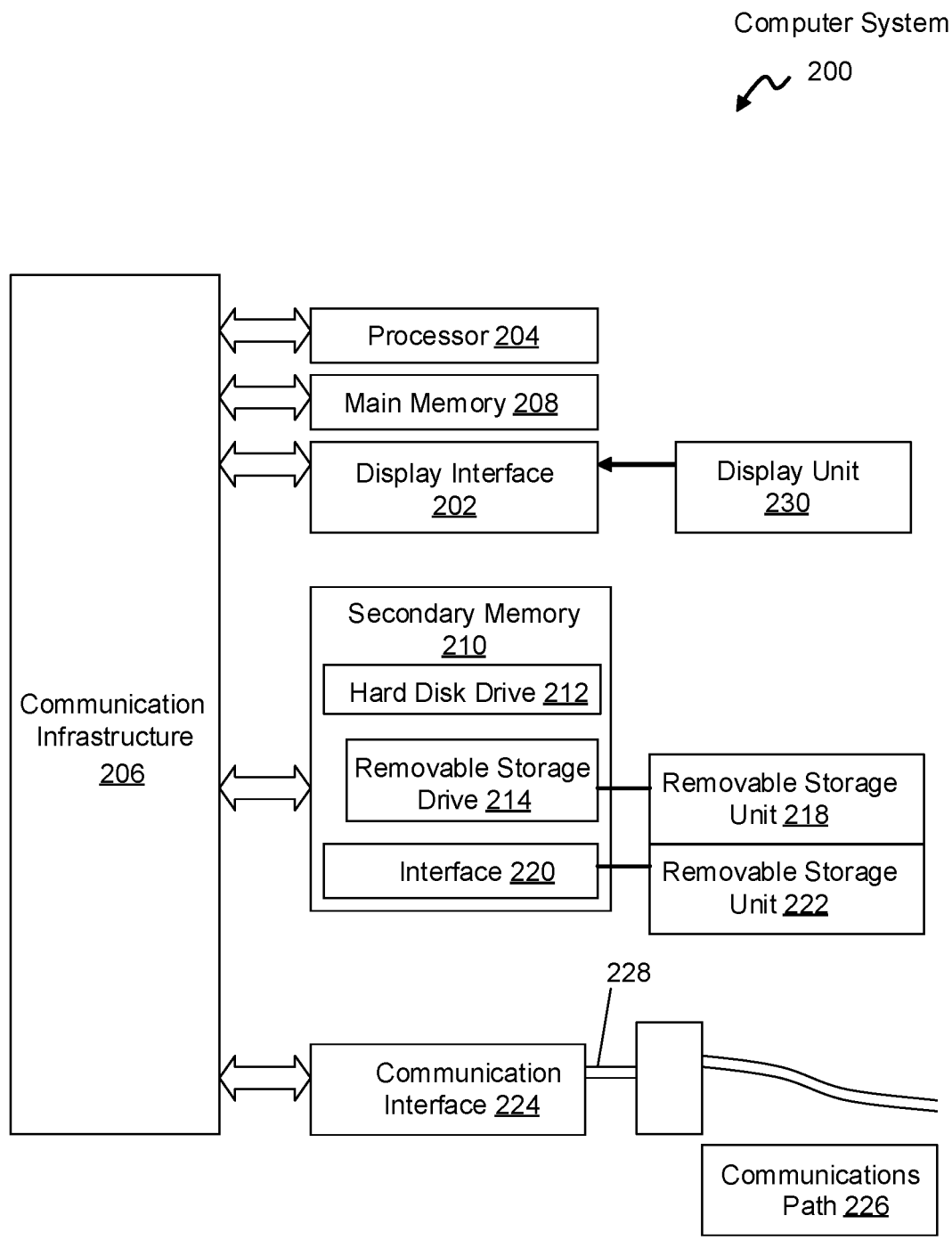
FIG. 2 illustrates an example of a computer system for implementing a method of controlling pod seats and a rotatable platform in accordance with aspects of the present disclosure.

Aspects of the present disclosure may be implemented using hardware, software, or a combination thereof and may be implemented in one or more computer systems or other processing systems. In an aspect of the present disclosure, features are directed toward one or more computer systems capable of carrying out the functionality described herein. For example, features of the ECU 112 may be implemented as one or more computer systems described in FIG. 2. An example of such the computer system 200 is shown in FIG. 2.

The computer system 200 includes one or more processors, such as the processor 204. The processor 204 is connected to a communication infrastructure 206 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

The computer system 200 may include a display interface 202 that forwards graphics, text, and other data from the communication infrastructure 206 (or from a frame buffer not shown) for display on a display unit 230. Computer system 200 also includes a main memory 208, preferably random access memory (RAM), and may also include a secondary memory 210. The secondary memory 210 may include, for example, a hard disk drive 212, and/or a removable storage drive 214, representing a floppy disk drive, a magnetic tape drive, an optical disk drive, a universal serial bus (USB) flash drive, etc. The removable storage drive 214 reads from and/or writes to a removable storage unit 218 in a well-known manner. Removable storage unit 218 represents a floppy disk, magnetic tape, optical disk, USB flash drive etc., which is read by and written to removable storage drive 214. As will be appreciated, the removable storage unit 218 includes a computer usable storage medium having stored therein computer software and/or data.

Alternative aspects of the present disclosure may include secondary memory 210 and may include other similar devices for allowing computer programs or other instructions to be loaded into computer system 200. Such devices may include, for example, a removable storage unit 222 and an interface 220. Examples of such may include a program cartridge and cartridge interface (such as that found in video game devices), a removable memory chip (such as an erasable programmable read only memory (EPROM), or programmable read only memory (PROM)) and associated socket, and other removable storage units 222 and interfaces 220, which allow software and data to be transferred from the removable storage unit 222 to computer system 200.

Computer system 200 may also include a communications interface 224. Communications interface 224 allows software and data to be transferred between computer system 200 and external devices. Examples of communications interface 224 may include a modem, a network interface (such as an Ethernet card), a communications port, a Personal Computer Memory Card International Association (PCMCIA) slot and card, etc. Software and data transferred via communications interface 224 are in the form of signals 228, which may be electronic, electromagnetic, optical or other signals capable of being received by communications interface 224. These signals 228 are provided to communications interface 224 via a communications path (e.g., channel) 226. This path 226 carries signals 228 and may be implemented using wire or cable, fiber optics, a telephone line, a cellular link, an RF link and/or other communications channels. In this document, the terms "computer program medium" and "computer usable medium" are used to refer generally to media such as a removable storage drive 218, a hard disk installed in hard disk drive 212, and signals 228. These computer program products provide software to the computer system 200. Aspects of the present disclosure are directed to such computer program products.

Computer programs (also referred to as computer control logic) are stored in main memory 208 and/or secondary memory 210. Computer programs may also be received via communications interface 224. Such computer programs, when executed, enable the computer system 200 to perform the features in accordance with aspects of the present disclosure, as discussed herein. In particular, the computer programs, when executed, enable the processor 204 to perform the features in accordance with aspects of the present disclosure. Accordingly, such computer programs represent controllers of the computer system 200.

In an aspect of the present disclosure where the method is implemented using software, the software may be stored in a computer program product and loaded into computer system 200 using removable storage drive 214, hard drive 212, or communications interface 220. The control logic (software), when executed by the processor 204, causes the processor 204 to perform the functions described herein. In another aspect of the present disclosure, the system is implemented primarily in hardware using, for example, hardware components, such as application specific integrated circuits (ASICs). Implementation of the hardware state machine so as to perform the functions described herein will be apparent to persons skilled in the relevant art(s).

Figure 3:
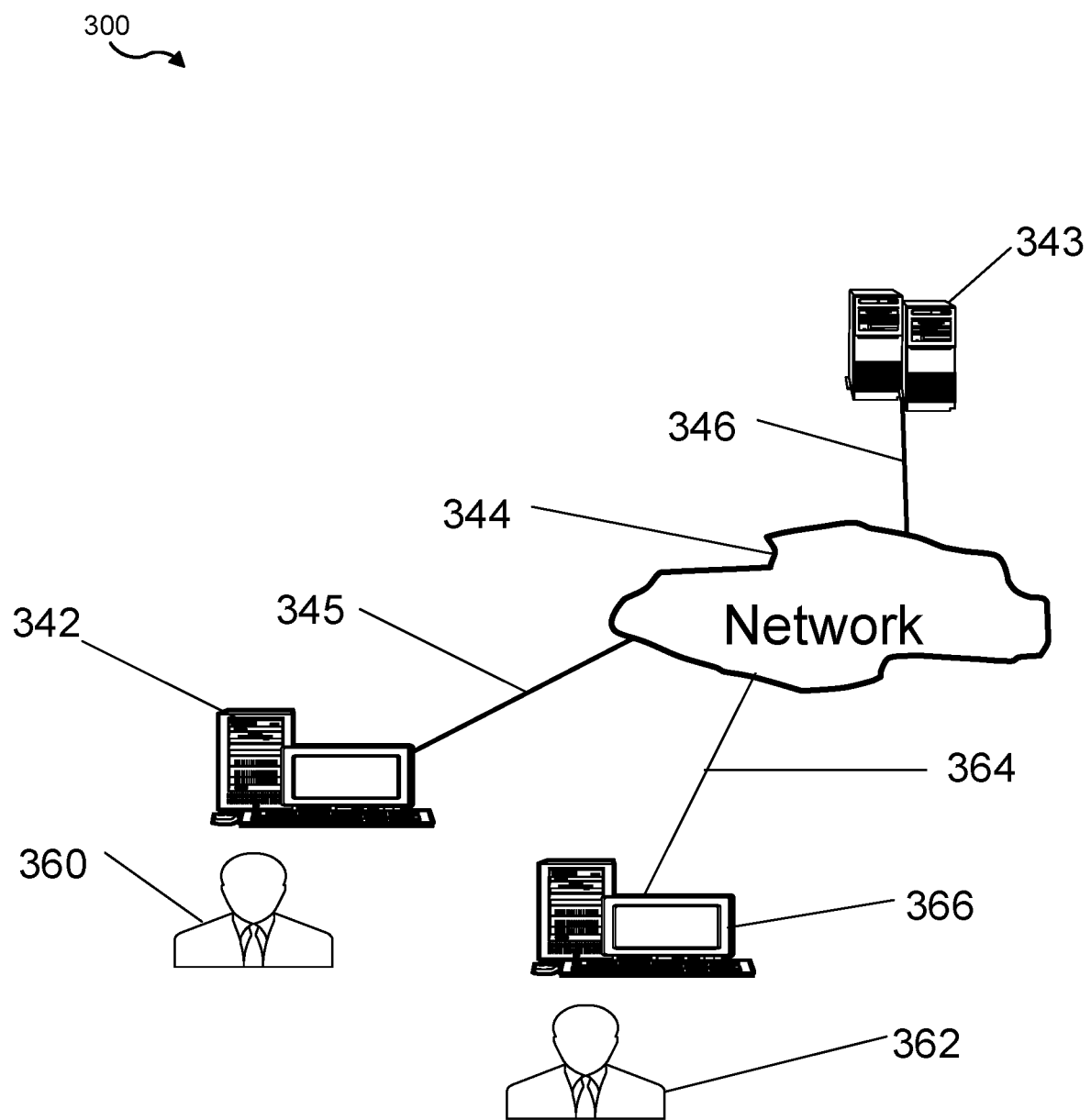
FIG. 3 illustrates a block diagram of various exemplary system components, in accordance with aspects of the present disclosure.

FIG. 3 illustrates a block diagram of various example system components, in accordance with an aspect of the present disclosure. FIG. 3 shows a communication system 300 usable in accordance with aspects of the present disclosure. The communication system 300 includes one or more accessors 360, 362 (also referred to interchangeably herein as one or more "users") and one or more terminals 342, 366. In one aspect, data for use in accordance with aspects of the present disclosure is, for example, input and/or accessed by accessors 360, 362 via terminals 342, 366, such as personal computers (PCs), minicomputers, mainframe computers, microcomputers, telephonic devices, or wireless devices, such as personal digital assistants ("PDAs") or a hand-held wireless devices coupled to a server 343, such as a PC, minicomputer, mainframe computer, microcomputer, or other device having a processor and a repository for data and/or connection to a repository for data, via, for example, a network 344, such as the Internet or an intranet, and couplings 345, 346, 364. The couplings 345, 346, 364 include, for example, wired, wireless, or fiberoptic links. In another example variation, the method and system in accordance with aspects of the present disclosure operate in a stand-alone environment, such as on a single terminal.

Figure 4:
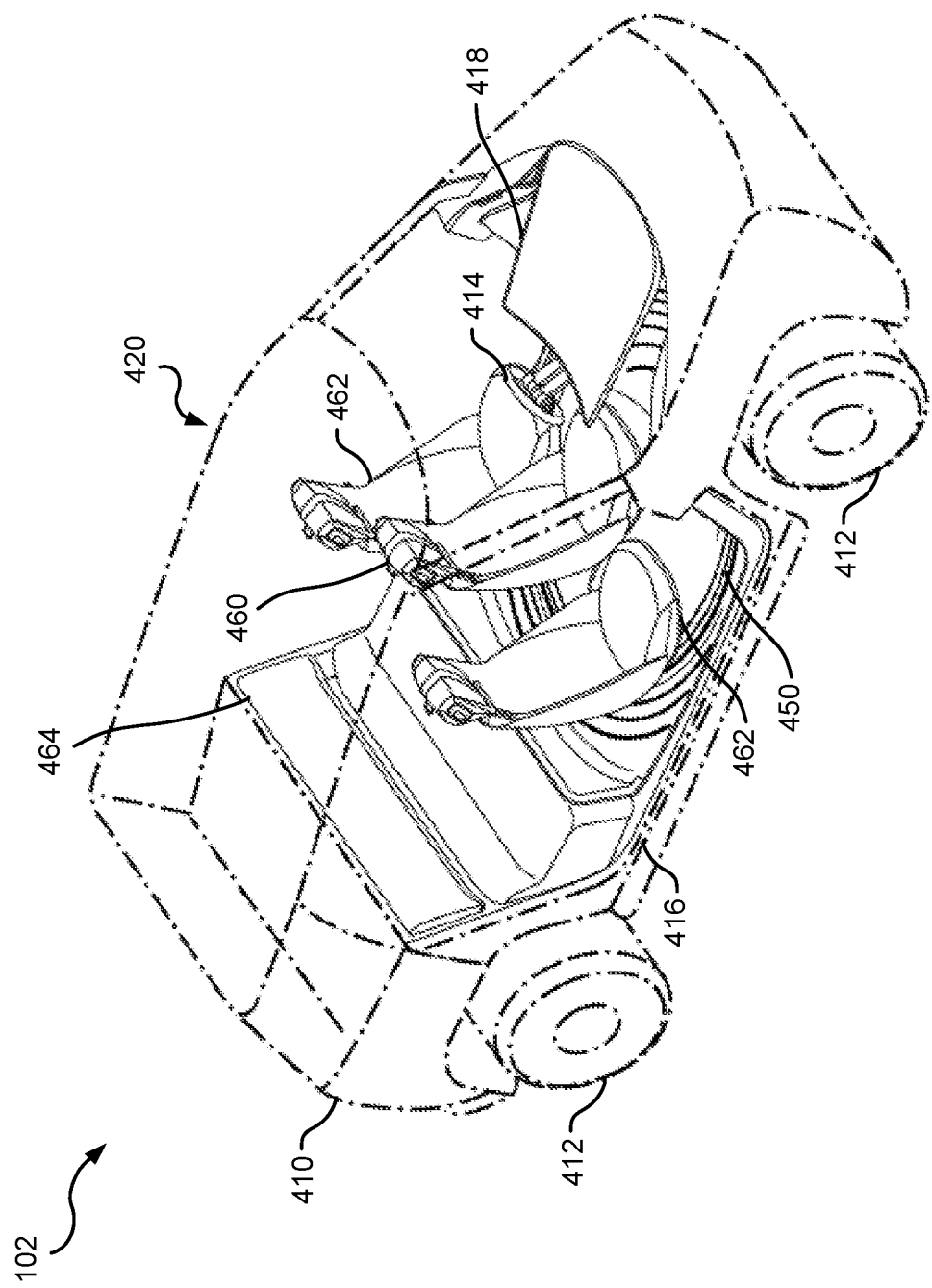
FIG. 4 illustrates a perspective view of an example of a vehicle including a rotatable platform in accordance with aspects of the present disclosure.

Referring to FIG. 4, an example of a vehicle 102 including certain aspects of the present disclosure is shown. Certain features and components of the vehicle 102 may be omitted for clarity. In some implementations, the vehicle 102 may include a body 410, one or more tires 412, which may be mounted on wheels, a steering wheel 414, a door 416, a dashboard 418, and an occupant compartment 420. The occupant compartment 420 may include a rotatable platform 450, a central pod seat 460, one or more companion pod seats 462, and one or more rear seats 464. The rotatable platform 450 may be disposed on or near the floor of the occupant compartment 420 and be supported on the body, wheels, and tires. The central pod seat 460 and the one or more companion pod seats 462 may be secured to the rotatable platform 450. The central pod seat 460 and the one or more companion pod seats 462 may optionally be individually rotatable. In certain non-limiting examples, the companion seats may rotate outward (facing the door 416) to facilitate ingress/egress of the occupants.

In a non-limiting example, the one or more companion pod seats 462 may include, for example, two companion pod seats 462. One of the one or more companion pod seats 462 may be on the left side of the central pod seat 460, and the other one of the one or more companion pod seats 462 may be on the right side of the central pod seat 460. In other examples, the central pod seat 460 may be disposed on a first side of the occupant compartment 420 and a single companion pod seat may be disposed on the other side of the occupant compartment 420. The one or more rear seats 464 may include 1, 2, 3, or more individual pod seats, 1, 2, 3, or more bucket seats, or a bench seat (as shown in FIG. 4). The seats 460, 462, 464 may be covered in polyester, nylon, vinyl, leather, faux leather, and/or other suitable materials.

In some implementations, the central pod seat 460 and/or the one or more companion pod seats 462 may be a collapsible seat assembly. The collapsible seat assembly may include one or more pneumatic bladder members to provide at least a base portion and seatback portion of the seat when inflated, and a plurality of internal rigid frame members that can provide a collapsing action to facilitate collapsing the seat assembly at least when the one or more pneumatic bladder members are in a deflated state. For example, the internal rigid frame members may be disposed at least partially within some of the one or more pneumatic bladder members. In the described configuration, the one or more pneumatic bladder members may also provide a level of support for a body seated in the seat assembly, which may allow for using less and/or lighter materials for the internal rigid frame members. Additionally, the one or more pneumatic bladder members may be composed of lightweight materials. In this regard, using the collapsible seat assembly described herein in a vehicle may result in a lighter weight seat assembly than fabric seats conventionally used in vehicles, though the use of the collapsible seat assembly described herein may not be limited to vehicles. In addition, using collapsible seats may bring more flexibility to vehicle interior configuration by allowing simplified movement, addition, removal, etc. of seat assemblies within the vehicle interior. Moreover, the one or more pneumatic bladder members may provide increased flexibility in seat adjustment, which may include but may not be limited to back support, lumbar support, headrest position, etc. For example, the one or more pneumatic bladder members can allow for (e.g., by inflating/deflating bladder members) functional changes to the seat assembly, such as a wider but open seat for luxury feel, a tight deep seat for a sporty feel, etc.

Additionally, one or more of the plurality of internal rigid frame members may be collapsible such to collapse the seat assembly when the one or more pneumatic bladder members are in a deflated state. For example, a given internal rigid frame member may have a telescoping action such that a portion of the internal rigid frame member telescopes within itself to shorten or extend. In another example, the internal rigid frame member may additionally or alternative have a folding action (e.g., provided by a hinge, flexible material, etc.) such that the portion of the internal rigid frame member can fold over, or otherwise be foldably connected to, another portion to shorten the internal rigid frame member. Allowing collapsing of the internal rigid frame member in this regard can lessen the size of the seat assembly, which may facilitate easier transport of the seat assembly. In addition, in one example, the seat assembly may include a strap that may at least one of retain the seat assembly in a collapsed state and/or facilitate collapsing the internal rigid frame members, deflating the one or more pneumatic bladder members, etc Referring now to FIG. 5, in some implementations, the occupant compartment 420 may include the rotatable platform 450 rotating about a central axis 454. The central axis 454 may intersect the center of the rotatable platform 450. The rotatable platform 450 may include one or more lighting fixtures 452. At least a portion of the one or more lighting fixtures 452 may be disposed concentrically around a center of the rotatable platform 450. The one or more lighting fixtures 452 may include light emitting diodes (LEDs), fluorescent lights, organic light emitting diodes (OLEDs), incandescent lights, and/or other suitable illumination sources.

Figure 5:
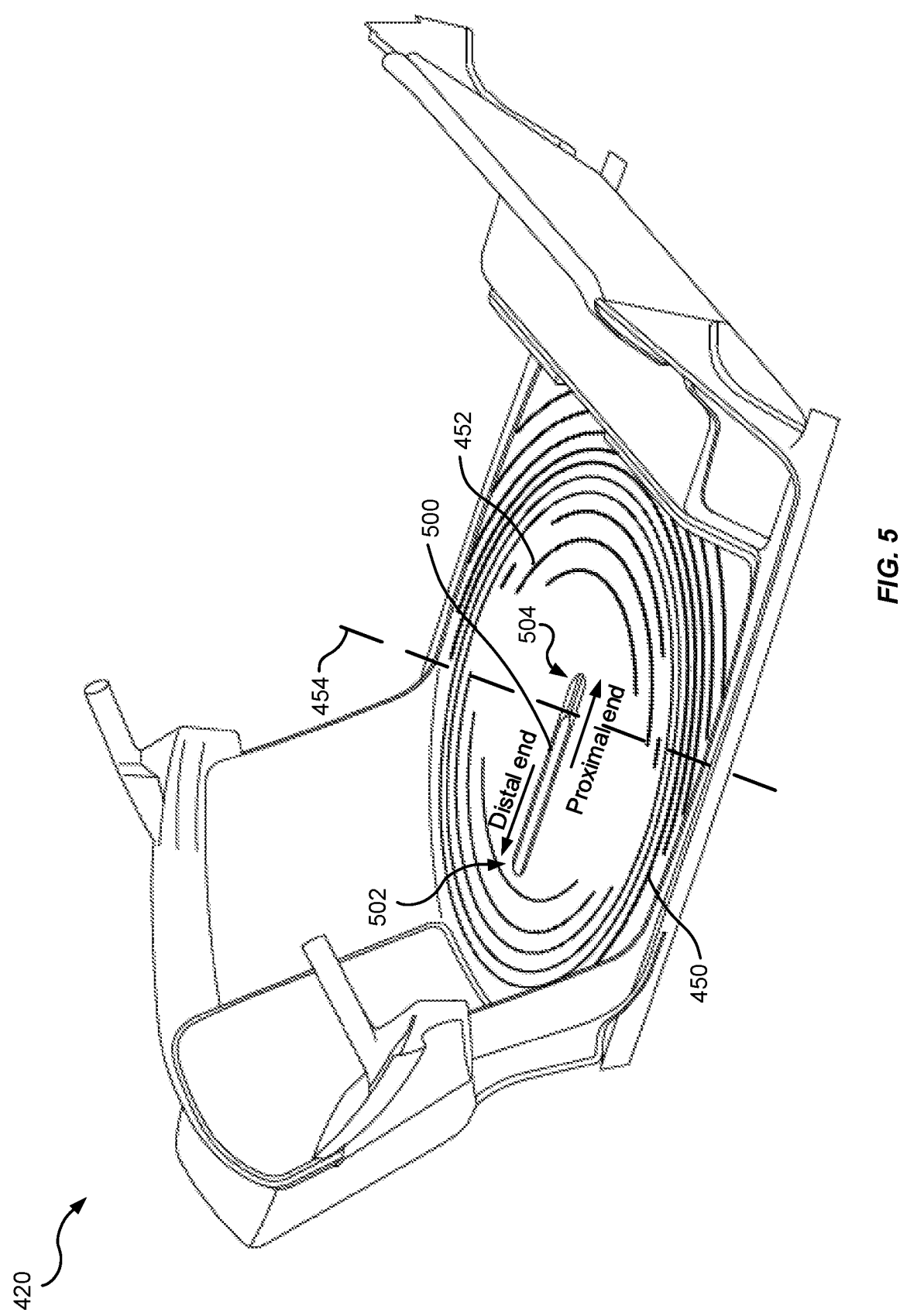
FIG. 5 illustrates a perspective view of an example of a rotatable platform in accordance with aspects of the present disclosure.

Still referring to FIG. 5, in an example, the rotatable platform 450 may be driven by a servo motor, a stepper motor, an electric actuator, a mechanical actuator, a fluid powered actuator, or other suitable rotatory actuators. The platform control component 150 may control the rotation of the rotatable platform 450 via the rotatory actuators. The rotatable platform 450 may be configured to rotate clockwise and/or counter-clockwise.

In certain implementations, the rotatable platform 450 may be disposed on one or more rolling-element bearings (not shown), such as ball bearings, roller bearings (e.g., spherical roller, cylindrical roller, tapered roller), or fluid bearings. The rolling-element bearings may include balls, rollers, or fluid disposed between races to effectuate rotation between the platform 450 and the rolling-element bearings.

In some examples, the one or more lighting fixtures 452 may visually provide indications to occupants (not shown) of the vehicle 102. For example, the one or more lighting fixtures 452 may provide a visual indication of an exit direction by illuminating a portion of light closer to the door 416 or sequentially flashing portions of the one or more lighting fixtures 452 from an opposite side of the rotatable platform 450 toward the door 416. As another example, the one or more lighting fixtures 452 may provide a visual indication of an emergency situation inside or around the occupant compartment 420 by flashing the one or more lighting fixtures, illuminating the occupant compartment 420 with flashing red light, or other suitable means. The visual indication of the emergency situation may direct the attention of passengers toward a display that provides further information regarding the emergency situation. In another example, the one or more lighting fixtures 452 may provide a visual indication of a mode of operation (described below) using various colors of light (e.g., red for driving mode, yellow for entertainment mode, green for recreation mode, blue for hybrid mode, and white for feature mode). In another example, the one or more light fixtures 452 may provide a visual indication of a rotational direction of the rotatable platform 450 by sequentially flashing portions of the one or more lighting fixtures 452 toward the direction of rotation. Other suitable methods of providing indications are also possible.

In some implementations, the one or more lighting fixtures 452 may be controlled by the lighting control component 156. For example, the lighting control component 156 may send one or more signals to the hardware driver(s) of the lighting fixtures 452 to adjust the lighting colors (e.g., red or blue), patterns (e.g., static, flashing at a predetermined interval), durations (e.g., 0.5 second (s), 1 s, 2 s, 5 s, 10 s), and intensities (e.g., 50 lumens (lm), 100 lm, 200 lm, 500 lm, 1000 lm) of the illumination sources in the lighting fixtures.

Still referring to FIG. 5, in certain implementations, the rotatable platform 450 may include the central pod seat 460 configured to translate linearly along a track 500 in the rotatable platform 450. The central pod seat 460 may translate linearly between a first position at a distal end 502 of the track 500 (toward the circumference of the rotatable platform 450) and a second position at a proximal end 504 of the track 500 (away from the circumference and/or toward the center of the rotatable platform 450). The central pod seat 460 may be driven to translate linearly between the first position and the second position along the track 500 using a worm drive (not shown), for example, as known to one skilled in the art. The worm shaft may be disposed in the track 500 and the worm wheel may be disposed in the central pod seat 460 in a non-limiting example. Other configurations may also be implemented, such as a sail winch servo, a screw actuator, a wheel and axle actuator, a cam actuator, or other suitable linear actuators.

Figure 6:
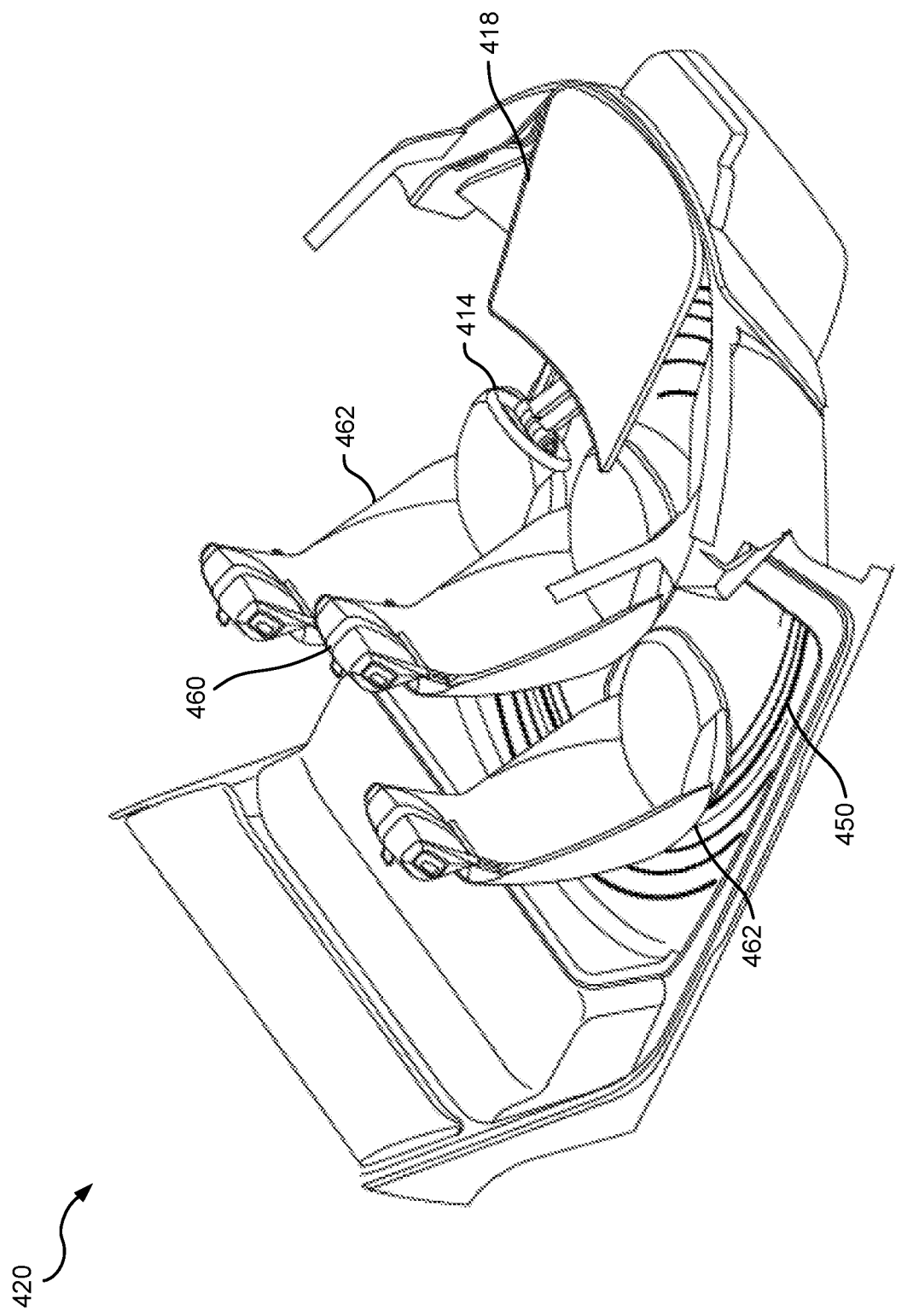
FIG. 6 illustrates a perspective view of an example of an occupant compartment of the vehicle in a driving mode, in accordance with aspects of the present disclosure.

Referring to FIG. 6, in some implementations, the occupant compartment 420 of the vehicle 102 may operate in a driving mode. During the transition to the driving mode, the rotatable platform 450 may rotate the central pod seat 460 and the one or more companion pod seats 462 toward a rear of the vehicle 102. The central pod seat 460 may translate linearly to the second position away from the circumference and/or toward the center of the rotatable platform 450. Occupants (not shown) in the central pod seat 460 and the one or more companion pod seats 462 may face the front of the vehicle 102. The dashboard 418 and/or the steering wheel 414 may extend toward the central pod seat 460. The vehicle operator (not shown) of the vehicle 102 may be seated in the central pod seat 460 and operate steering wheel 414 (FIG. 1). In other examples, the vehicle operator (not shown) may operate the vehicle 102 from one of the one or more companion pod seats 462.

In some implementations, the platform control component 150, the central seat control component 152, and/or the lighting control component 156 may cause the occupant compartment 420 to operate in the driving mode. For example, the platform control component 150 may send one or more signals to the hardware driver(s) of the rotatory actuators to rotate the rotatable platform 150 such that the central pod seat 460 and/or the one or more companion pod seats 462 are rotated toward the rear of the vehicle 102. During the rotation (if any) of the rotatable platform 150, the lighting control component 156 may send one or more signals to the hardware driver(s) of the lighting fixtures 452 to cause the light fixtures 452 to display red light to indicate the occupant compartment 420 is entering the driving mode. The lighting control component 156 may also send one or more signals to the hardware driver(s) of the lighting fixtures 452 to cause the light fixtures 452 to sequentially flash portions of the one or more lighting fixtures 452 toward the direction of rotation. The central seat control component 152 may send one or more signals to the hardware driver(s) of the linear actuator (e.g., worm drive) to translate linearly the central pod seat 460, along the track 500, to the second position toward the proximal end 504 of the rotatable platform 150. In some examples, the vehicle operator (not shown) sitting in the central pod seat 460 may adjust the linear position of the central pod seat 460 between the first position (at the distal end 502) and the second position (at the proximal end 504). The vehicle operator may adjust the linear position based on his ability to reach the steering wheel 414, his height, the space in the occupant compartment 420 and/or his comfort.

Figure 7:
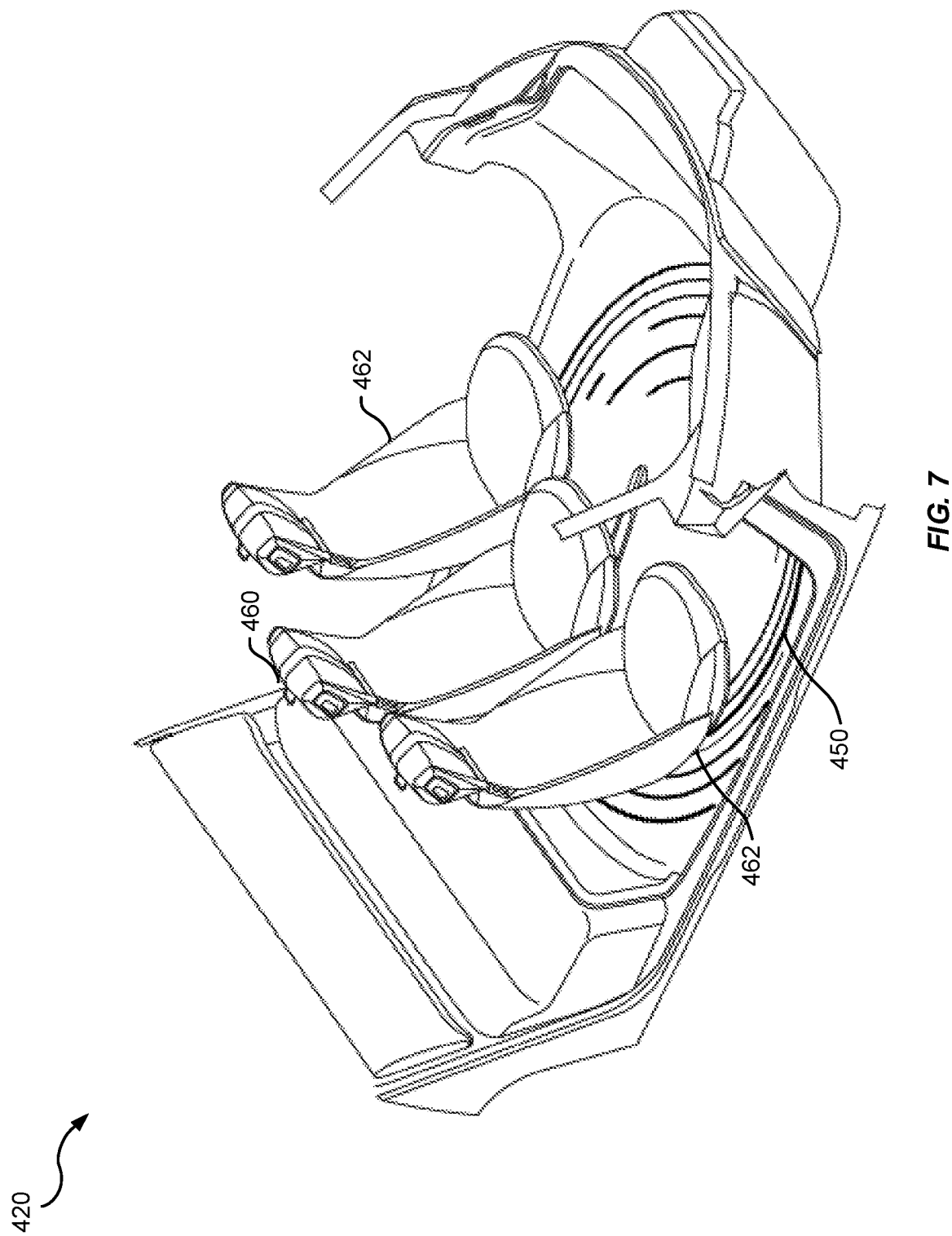
FIG. 7 illustrates a perspective view of an example of the occupant compartment of the vehicle in an entertainment mode, in accordance with aspects of the present disclosure.

Turning to FIG. 7, in certain implementations, the occupant compartment 420 of the vehicle 102 may operate in an entertainment mode. During the transition to the entertainment mode, the rotatable platform 450 may rotate the central pod seat 460 and the one or more companion pod seats 462 toward the rear of the vehicle 102. The central pod seat 460 may translate linearly to the first position toward the circumference of the rotatable platform 450. Occupants (not shown) in the central pod seat 460 and the one or more companion pod seats 462 may face the front of the vehicle 102. The occupant compartment 420 may optionally include an entertainment system (not shown) having a display and a media player (not shown). The display may be viewed by the vehicle operator and the passengers of the vehicle 102 sitting in the central pod seat 460 and the one or more companion pod seats 462 during the entertainment mode. The display may show movies, television shows, animations, and/or other programs. The media player may provide the movies, television shows, animations, and/or other programs via Blu-Ray™ Discs, Digital Video Discs™, media services, or other sources. The infotainment system controller 120 may control the entertainment system. The display controller 118 may control the display (not shown).

In some implementations, the platform control component 150, the central seat control component 152, the lighting control component 156, the display controller 118, and/or the infotainment system controller 120 may cause the occupant compartment 420 to operate in the entertainment mode. For example, the platform control component 150 may send one or more signals to the hardware driver(s) of the rotatory actuators to rotate the rotatable platform 150 such that the central pod seat 460 and/or the one or more companion pod seats 462 are rotated toward the rear location of the vehicle 102 with the central pod seat 460 and/or the one or more companion pod seats 462 facing the forward. During the rotation (if any) of the rotatable platform 150, the lighting control component 156 may send one or more signals to the hardware driver(s) of the lighting fixtures 452 to cause the light fixtures 452 to display yellow light to indicate the occupant compartment 420 is entering the entertainment mode. The lighting control component 156 may also send one or more signals to the hardware driver(s) of the lighting fixtures 452 to cause the light fixtures 452 to sequentially flash portions of the one or more lighting fixtures 452 toward the direction of rotation. The central seat control component 152 may send one or more signals to the hardware driver(s) of the linear actuator (e.g., worm drive) to translate linearly the central pod seat 460, along the track 500, to the first position toward the distal end 502 of the rotatable platform 150. The infotainment system controller 120 may load the media content selected by an occupant (e.g., movie/shows from a Blu-Ray™ player or network service or music) and send the media content to the display controller 118. The display controller 118 may display the media content on the display (not shown).

Figure 8:
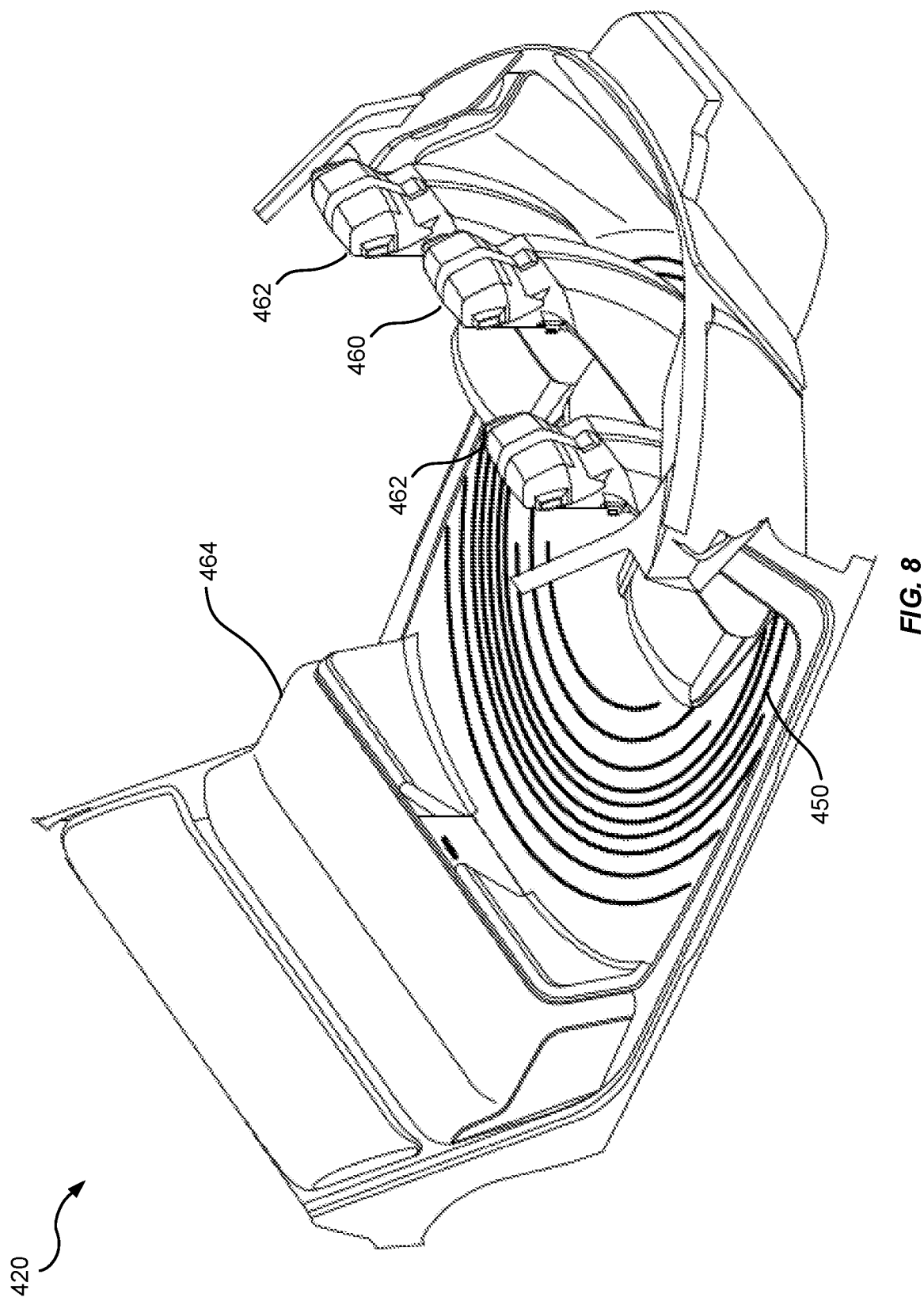
FIG. 8 illustrates a perspective view of an example of the occupant compartment of the vehicle in a recreation mode, in accordance with aspects of the present disclosure.

Turning to FIG. 8, in some examples, the occupant compartment 420 of the vehicle 102 may operate in a recreation mode. During the transition to the recreation mode, the rotatable platform 450 may rotate the central pod seat 460 and the one or more companion pod seats 462 toward a front of the vehicle 102. The central pod seat 460 may translate linearly to the first position along the track 500 (not shown) toward the circumference of the rotatable platform 450. Occupants (not shown) in the central pod seat 460 and the one or more companion pod seats 462 may face the rear of the vehicle 102. In the recreation mode, occupants (not shown) in the central pod seat 460 and the one or more companion pod seats 462 may face and converse with occupants (not shown) sitting in the one or more rear seats 464.

Still referring to FIG. 8, in optional implementations, one or more of the central pod seat 460 and the one or more companion pod seats 462 may be removed from the rotatable platform 450. With the central pod seat 460 and the one or more companion pod seats 462 removed, the occupant compartment 420 may be utilized as a play area for children (not shown), a storage area, a sleeping quarter, etc.

In some implementations, the platform control component 150, the central seat control component 152, and/or the lighting control component 156 may cause the occupant compartment 420 to operate in the recreation mode. For example, the platform control component 150 may send one or more signals to the hardware driver(s) of the rotatory actuators to rotate the rotatable platform 150 such that the central pod seat 460 and/or the one or more companion pod seats 462 are rotated toward the front of the vehicle 102. During the rotation (if any) of the rotatable platform 150, the lighting control component 156 may send one or more signals to the hardware driver(s) of the lighting fixtures 452 to cause the light fixtures 452 to display green light to indicate the occupant compartment 420 is entering the recreation mode. The lighting control component 156 may also send one or more signals to the hardware driver(s) of the lighting fixtures 452 to cause the light fixtures 452 to sequentially flash portions of the one or more lighting fixtures 452 toward the direction of rotation. The central seat control component 152 may send one or more signals to the hardware driver(s) of the linear actuator (e.g., worm drive) to translate linearly the central pod seat 460, along the track 500, to the first position toward the distal end 502 of the rotatable platform 150.

Figure 9:
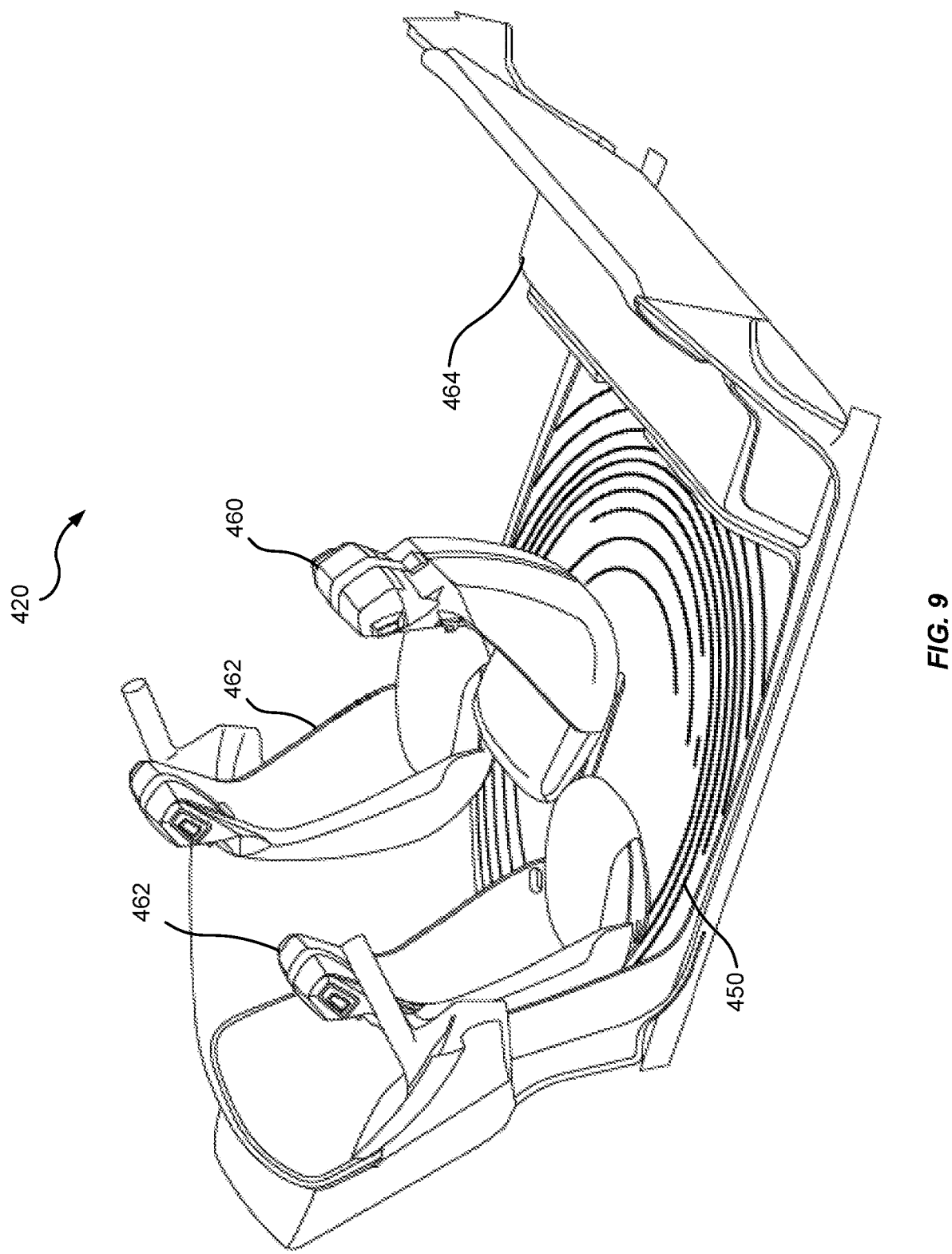
FIG. 9 illustrates a perspective view of an example of the occupant compartment of the vehicle in a hybrid mode, in accordance with aspects of the present disclosure.

Turning now to FIG. 9, in certain non-limiting examples, the occupant compartment 420 of the vehicle 102 may operate in a hybrid mode. During the transition to the hybrid mode, the rotatable platform 450 may rotate the central pod seat 460 and the one or more companion pod seats 462 toward a rear of the vehicle 102. The central pod seat 460 may translate linearly to the second position away from the circumference and/or toward the center of the rotatable platform 450. The one or more companion pod seats 462 may independently rotate so the occupants sitting in the one or more companion pod seats 462 face the rear of the vehicle 102. An occupant (not shown) in the central pod seat 460 may face the front of the vehicle 102. The dashboard 418 and/or the steering wheel 414 may extend toward the central pod seat 460. The vehicle operator (not shown) of the vehicle 102 may be seated in the central pod seat 460 and operate steering wheel 414 (FIG. 4). In the hybrid mode, the vehicle operator may operate the vehicle 102 while the occupants in the one or more companion pod seats 462 converse, for example, with occupants in the one or more rear seats 464.

In some implementations, the platform control component 150, the central seat control component 152, the companion seat control component 154, and/or the lighting control component 156 may cause the occupant compartment 420 to operate in the hybrid mode. For example, the platform control component 150 may send one or more signals to the hardware driver(s) of the rotary actuators to rotate the rotatable platform 150 such that the central pod seat 460 and/or the one or more companion pod seats 462 are rotated toward the front of the vehicle 102. During the rotation (if any) of the rotatable platform 150, the lighting control component 156 may send one or more signals to the hardware driver(s) of the lighting fixtures 452 to cause the light fixtures 452 to display blue light to indicate the occupant compartment 420 is entering the hybrid mode. The lighting control component 156 may also send one or more signals to the hardware driver(s) of the lighting fixtures 452 to cause the light fixtures 452 to sequentially flash portions of the one or more lighting fixtures 452 toward the direction of rotation. The central seat control component 152 may send one or more signals to the hardware driver(s) of the linear actuator (e.g., worm drive) to translate linearly the central pod seat 460, along the track 500, to the second position toward the proximal end 504 of the rotatable platform 150. Further, the central seat control component 152 may send one or more signals to the hardware driver(s) of a rotary actuator for the central pod seat 460 to rotate the central pod seat 460 so the vehicle operator faces the front of the vehicle 102.

In different implementations, the platform control component 150 may send one or more signals to the hardware driver(s) of the rotary actuators to rotate the rotatable platform 150 such that the central pod seat 460 and/or the one or more companion pod seats 462 are rotated toward the rear of the vehicle 102. During the rotation (if any) of the rotatable platform 150, the lighting control component 156 may send one or more signals to the hardware driver(s) of the lighting fixtures 452 to cause the light fixtures 452 to display blue light to indicate the occupant compartment 420 is entering the hybrid mode. The lighting control component 156 may also send one or more signals to the hardware driver(s) of the lighting fixtures 452 to cause the light fixtures 452 to sequentially flash portions of the one or more lighting fixtures 452 toward the direction of rotation. The central seat control component 152 may send one or more signals to the hardware driver(s) of the linear actuator (e.g., worm drive) to translate linearly the central pod seat 460, along the track 500, to the second position toward the proximal end 504 of the rotatable platform 150. The companion seat control component 154 may send one or more signals to the hardware driver(s) of the rotary actuators of the one or more companion pod seats 462 to rotate the one or more companion pod seats 462 so the occupants face the rear of the vehicle 102.

Figure 10:
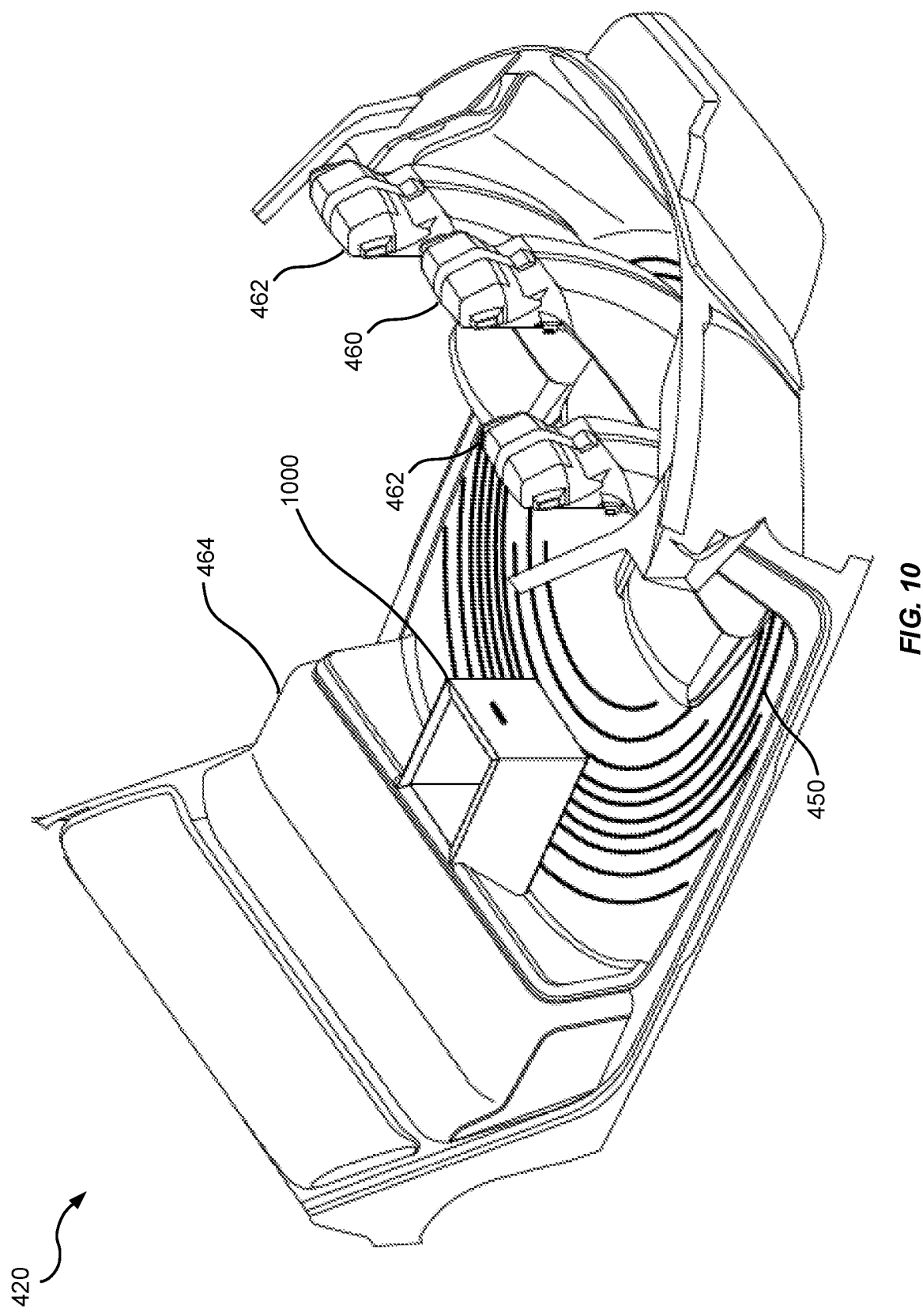
FIG. 10 illustrates a perspective view of an example of the occupant compartment of the vehicle in a feature mode, in accordance with aspects of the present disclosure.

Turning now to FIG. 10, in some implementations, the occupant compartment 420 of the vehicle 102 may operate in a feature mode. During the transition to the feature mode, the rotatable platform 450 may rotate the central pod seat 460 and the one or more companion pod seats 462 toward a front of the vehicle 102. The central pod seat 460 may translate linearly to the first position toward the circumference of the rotatable platform 450. A device 1000 may extend from the one or more rear seats 464, such as a bench seat 464. The device 1000 may be partially or completely stored in the bench seat 464 when retracted and be partially or completely extended when used. The device 1000 may be an electrical fireplace, a game table, a chess table, a display, a refrigerator, or other leisure equipment. Occupants (not shown) in the central pod seat 460 and/the one or more companion pod seats 462 may face the rear of the vehicle 102. In the feature mode, occupants (not shown) in the central pod seat 460 and the one or more companion pod seats 462 may face occupants (not shown) sitting in the one or more rear seats 464.

In some implementations, the platform control component 150, the central seat control component 152, and/or the lighting control component 156 may cause the occupant compartment 420 to operate in the feature mode. For example, the platform control component 150 may send one or more signals to the hardware driver(s) of the rotary actuators to rotate the rotatable platform 150 such that the central pod seat 460 and/or the one or more companion pod seats 462 are rotated toward the front of the vehicle 102. During the rotation (if any) of the rotatable platform 150, the lighting control component 156 may send one or more signals to the hardware driver(s) of the lighting fixtures 452 to cause the light fixtures 452 to display white light to indicate the occupant compartment 420 is entering the recreation mode. The lighting control component 156 may also send one or more signals to the hardware driver(s) of the lighting fixtures 452 to cause the light fixtures 452 to sequentially flash portions of the one or more lighting fixtures 452 toward the direction of rotation. The central seat control component 152 may send one or more signals to the hardware driver(s) of the linear actuator (e.g., worm drive) to translate linearly the central pod seat 460, along the track 500, to the first position toward the distal end 502 of the rotatable platform 150. The electronic control unit 112 may send one or more signals to the hardware driver(s) of the device 1000 to cause the device to partially or completely extend.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:
1. A vehicle, comprising:
one or more tires;
a body;
a door; and
an occupant compartment including:
a rotatable platform;

a central pod seat and one or more companion pod seats disposed on the rotatable platform; and
one or more rear seats,
wherein the rotatable platform is configured to rotate the central pod seat and the one or more companion pod seats toward a front of the vehicle in a first mode and toward a rear of the vehicle in a second mode; and
wherein the central pod seat is further configured to translate linearly away from a center of the rotatable platform into a first position and toward the center of the rotatable platform into a second position.

2. The vehicle of claim 1, wherein the one or more companion pod seats are configured to rotate toward the door of the vehicle.

3. The vehicle of claim 1, further comprising one or more light emitting diode (LED) fixtures disposed on a surface of the rotatable platform.

4. The vehicle of claim 3, wherein the one or more LED fixtures include one or more LED strips disposed concentrically on the surface of the rotatable platform.

5. The vehicle of claim 3, wherein the one or more LED fixtures are configured to indicate an exit direction, an emergency, a mode of operation, and a rotational direction.

6. The vehicle of claim 1, further comprising an electronic leisure equipment device disposed inside of the one or more rear seats, wherein the electronic leisure equipment device is configured at least protrude partially from the one or more rear seats when activated.

7. The vehicle of claim 1, further comprising a storage compartment disposed inside of the one or more rear seats.

8. An occupant compartment, comprising:
a rotatable platform;
a central pod seat and one or more companion pod seats disposed on the rotatable platform; and
one or more rear seats,
wherein the rotatable platform is configured to rotate the central pod seat and the one or more companion pod seats toward a front of the vehicle in a first mode and toward a rear of the vehicle in a second mode; and
wherein the central pod seat is further configured to translate linearly away from a center of the rotatable platform into a first position and toward the center of the rotatable platform into a second position.

9. The occupant compartment of claim 8, wherein the one or more companion pod seats are configured to rotate toward a door of the occupant compartment.

10. The occupant compartment of claim 8, further comprising one or more light emitting diode (LED) fixtures disposed on a surface of the rotatable platform.

11. The occupant compartment of claim 8, wherein the one or more LED fixtures include one or more LED strips disposed concentrically on the surface of the rotatable platform.

12. The occupant compartment of claim 8, wherein the one or more LED fixtures are configured to indicate an exit direction, an emergency, a mode of operation, and a rotational direction.

13. The occupant compartment of claim 8, further comprising an electronic leisure equipment device disposed inside of the one or more rear seats, wherein the electronic leisure equipment device is configured at least protrude partially from the one or more rear seats when activated.

14. The occupant compartment of claim 8, further comprising a storage compartment disposed inside of the one or more rear seats.

15. A rotatable platform in a vehicle, comprising:
a central pod seat and one or more companion pod seats disposed on the rotatable platform;
wherein the rotatable platform is configured to rotate the central pod seat and the one or more companion pod seats toward a front of the vehicle in a first mode and toward a rear of the vehicle in a second mode;
wherein the central pod seat is further configured to translate linearly away from a center of the rotatable platform into a first position and toward the center of the rotatable platform into a second position.

16. The rotatable platform of claim 15, wherein the one or more companion pod seats are configured to rotate toward a door of the vehicle.

17. The rotatable platform of claim 15, further comprising one or more light emitting diode (LED) fixtures disposed on a surface of the rotatable platform.

18. The rotatable platform of claim 17, wherein the one or more LED fixtures include one or more LED strips disposed concentrically on the surface of the rotatable platform.

19. The rotatable platform of claim 17, wherein the one or more LED fixtures are configured to indicate an exit direction, an emergency, a mode of operation, and a rotational direction.

20. The rotatable platform of claim 17, wherein the central pod seat and the one or more companion pod seats are detachable from the rotatable platform.

* * * * *